United States Patent [19]

Schläfer et al.

[11] Patent Number: 4,975,539
[45] Date of Patent: Dec. 4, 1990

[54] WATER-SOLUBLE MONOAZO COMPOUNDS HAVING FIBER-REACTIVE GROUPS OF THE VINYLSULFONE SERIES AND A SULFO-SUBSTITUTED BENZOYLAMINO NAPHTHOL COUPLING COMPONENT, SUITABLE AS DYESTUFFS

[75] Inventors: Ludwig Schläfer, Taunus; Werner H. Russ, Hofheim am Taunus, both of Fed. Rep. of Germany

[73] Assignee: Hoechst Aktiengesellschaft, Frankfurt, Fed. Rep. of Germany

[21] Appl. No.: 401,008

[22] Filed: Aug. 31, 1989

[30] Foreign Application Priority Data

Sep. 2, 1988 [DE] Fed. Rep. of Germany ..... 38297817

[51] Int. Cl.$^5$ .............. C09B 62/51; C09B 63/53; D06P 1/384
[52] U.S. Cl. .............. 534/642; 534/582; 534/641; 534/643; 534/887
[58] Field of Search .............. 534/641, 642, 643

[56] References Cited

U.S. PATENT DOCUMENTS

| | | | |
|---|---|---|---|
| 3,008,950 | 11/1961 | Heyna et al. | 534/642 X |
| 3,098,096 | 7/1963 | Feeman | 534/642 X |
| 3,426,008 | 2/1969 | Meininger et al. | 534/641 |
| 3,553,189 | 1/1971 | Sugiyama et al. | 534/642 |
| 3,637,648 | 1/1972 | Kuhne et al. | 534/641 |
| 3,655,642 | 4/1972 | Meininger et al. | 534/642 |
| 4,473,498 | 9/1984 | Schlafer et al. | 534/641 |
| 4,568,350 | 2/1986 | Rohrer | 534/642 |
| 4,719,053 | 1/1988 | Schlafer et al. | 534/641 |
| 4,855,411 | 8/1989 | Thompson et al. | 534/642 |

FOREIGN PATENT DOCUMENTS 238894 9/1987 European Pat. Off. ............ 534/642

*Primary Examiner*—Floyd D. Higel
*Assistant Examiner*—Fiona T. Powers

[57] ABSTRACT

Water-soluble azo compounds which have fiber-reactive and dye properties and dye carboxamido- and/or hydroxyl-containing materials, such as fiber materials, in particular cellulose fiber materials, in strong, predominantly bluish red to orange hues which have good fastness properties; they conform to the general formula (1)

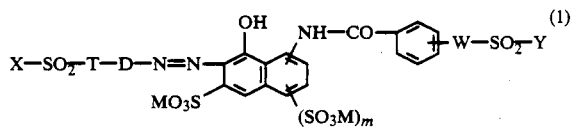

in which the symbols have the following meaning:
M is a hydrogen atom or an alkali metal,
T is a covalent bond or a methylene group or an amino group —N(R)—, in which R is alkyl of 1 to 4 carbon atoms,
D is a group of the formula

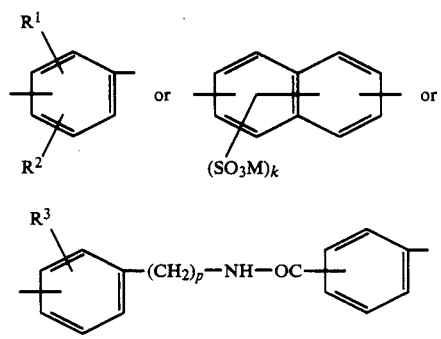

in which
$R^1$ is alkyl of 1 to 4 carbon atoms, hydroxy, nitro, hydrogen, alkoxy of 1 to 4 carbon atoms, chlorine, bromine or carboxy,
$R^2$ is hydrogen, alkyl of 1 to 4 carbon atoms, alkoxy of 1 to 4 carbon atoms, chlorine or sulfo,
$R^3$ is hydrogen or sulfo,
k is the number zero or 1,
p is the number zero, 1 or 2 and
M has the abovementioned meaning;
m is the number zero, 1 or 2;
W has one of the meanings of T;
X is vinyl, β-chloroethyl, β-thiosulfatoethyl or β-sulfatoethyl;
Y is vinyl or β-chloroethyl; the fiber-reactive benzoylamino grouping is bound to the β-naphthol radical in the 1-, 2- or 3-position.

22 Claims, No Drawings

WATER-SOLUBLE MONOAZO COMPOUNDS HAVING FIBER-REACTIVE GROUPS OF THE VINYLSULFONE SERIES AND A SULFO-SUBSTITUTED BENZOYLAMINO NAPHTHOL COUPLING COMPONENT, SUITABLE AS DYESTUFFS

DESCRIPTION

The invention is in the technical field of fiber-reactive azo dyes.

Some monoazo compounds which contain two 4-(β-sulfatoethylsulfonylmethyl)benzoylamino groups are disclosed in U.S. Pat. No. 4,473,498. The dye properties of these compounds seemed, however, in need of improvement.

By means of the present invention, new fiber-reactive monoazo dyes have now been found which conform to the general formula (1)

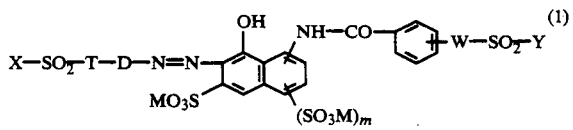

in which

M is a hydrogen atom or an alkali metal, such as sodium, potassium and lithium;

T is a direct covalent bond or is a methylene group or is a divalent amino group of the formula —N(R)—, in which R is an alkyl of 1 to 4 carbon atoms, such as ethyl and, in particular, methyl;

D is a group conforming to the general formula (2a), (2b), (2c)

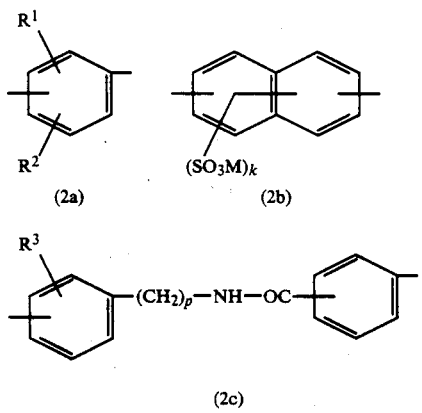

in which $R^1$ is alkyl of 1 to 4 carbon atoms, such as ethyl and in particular methyl, hydroxy or nitro, or preferably hydrogen, alkoxy of 1 to 4 carbon atoms, such as ethoxy and in particular methoxy, chlorine, bromine or carboxy, $R^2$ is hydrogen, alkyl of 1 to 4 carbon atoms, such as ethyl and in particular methyl, alkoxy of 1 to 4 carbon atoms, such as ethoxy and in particular methoxy, chlorine or sulfo, $R^3$ is hydrogen or sulfo, k is the number zero or 1 (where, if k is zero, this group is a hydrogen atom), p is the number zero, 1 or 2 and M has the abovementioned meaning;

m is the number zero, 1 or 2 (where, if m is zero, this group is a hydrogen atom);

W has one of the meanings of T;

X is vinyl, β-chloroethyl, β-thiosulfatoethyl or β-sulfatoethyl, preferably vinyl and in particular β-sulfatoethyl;

Y is vinyl or β-chloroethyl, preferably β-chloroethyl;

the fiber-reactive benzoylamino grouping is bound to the 8-naphthol radical in the 1-, 2- or 3-position;

the individual formula members can have meanings which are identical to or different from one another.

The substituents "sulfo", "carboxy", "thiosulfato" and "sulfato" include not only their acid form but also their salt form. Accordingly, sulfo groups are groups conforming to the general formula —$SO_3M$, carboxy groups conforming to the general formula —COOM, thiosulfato groups conforming to the general formula —S—$SO_3M$ and sulfato groups conforming to the general formula —$OSO_3M$ in which M has the abovementioned meaning.

The new azo compounds can be present not only in the acid form but also in the form of their salts. They are preferably in the form of the salts and are also preferably used in the form of these salts for dyeing (here and hereinafter understood in the general sense, including printing) of hydroxy- and/or carboxylamido-containing materials, in particular fiber materials. They can be readily used for all dyeing and printing processes, such as are described in a large number for fiber-reactive dyes, and produce, with high color yields and a good color buildup, strong dyeings and prints which have good fastness properties, of which in particular the wet fastness properties may be mentioned.

Of the azo compounds of the general formula (1) according to the invention, those are preferred in which D is a radical of the general formula (2a) or (2b), furthermore those in which X is a β-sulfatoethyl group, furthermore those in which T is a covalent bond, furthermore those in which W is a direct bond or in particular a methylene group or a divalent N-methylamino group, and furthermore those in which Y is the β-chloroethyl group and W is simultaneously the N-methylamino or the methylene group.

Of the compounds (1), in particular those are preferred which conform to the general formula (1a)

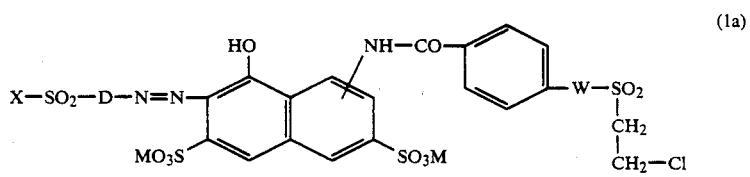

in which M, X, D and W have the abovementioned, in particular the preferred, meanings, where W is in particular preferably the methylene group, and the benzoylamino grouping is bound to the 8-naphthol radical in the 1- or 2-position, preferably in the 1-position, furthermore those azo compounds which conform to the general formula (1b)

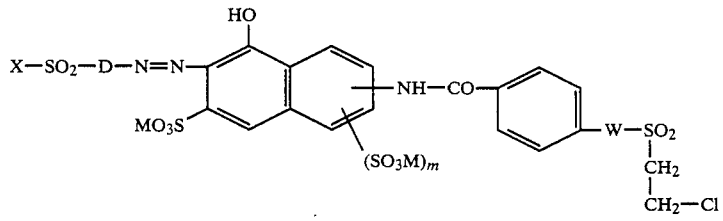

in which the benzoylamino group is bound to the 8-naphthol component in the 2- or 3-position, preferably in the 3-position, and m is the number zero or 1 and X, D, M and W have the abovementioned meanings, in particular those mentioned as preferred; of these, W is particularly preferably the methylene group, furthermore m is particularly preferably the number 1, wherein this case this group —$SO_3M$ is preferably bound in the 4-position.

The present invention furthermore relates to a process for the preparation of the new compounds of the general formula (1), which comprises coupling a diazonium salt of an aromatic amino compound which conforms to the general formula (3)

in which X, T and D have the abovementioned meanings with a compound conforming to the general formula (4)

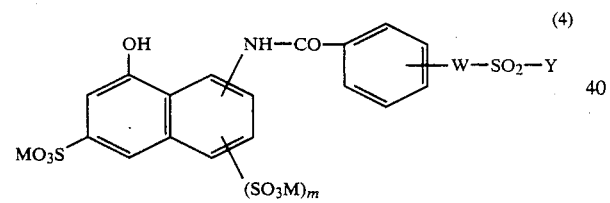

in which M, m, W and Y have the abovementioned meanings.

The conversion of the amino compound of the general formula (3) into its diazonium salt is carried out in the known manner of diazotization of aromatic amino compounds, for example in aqueous medium by means of nitrous acid at a temperature between −5° C. and +10° C. and a pH of less than 2.5. The coupling reaction according to the invention of the diazonium salt with the compound (4) is also carried out analogously to known procedures of the reaction of diazonium compounds with coupling components to give azo compounds, for example in aqueous medium at a pH between 3 and 8, preferably between 4 and 7, and at a temperature between 5° and 35° C., preferably between 10° and 25° C.

The starting compounds of the general formula (3) have been described in the literature in a large number. Compounds of the general formula (3) are, for example: 4-(β-sulfatoethylsulfonyl)-aniline, 4-(β-thiosulfatoethylsulfonyl)-aniline, 4-vinylsulfonyl-aniline, 4-(β-sulfatoethylsulfonyl-methyl)-aniline, 3-(β-sulfatoethylsulfonylmethyl)-aniline, 3-(β-sulfatoethylsulfonyl)aniline, 2-methoxy-4-(β-sulfatoethylsulfonyl)-aniline, 2-methoxy-5-(β-sulfatoethylsulfonyl)-aniline, 2,5-dimethoxy-4-(β-sulfatoethylsulfonyl)-aniline, 2-methoxy-5-methyl-4-(β-sulfatoethylsulfonyl)-aniline, 2-bromo-4-(β-sulfatoethylsulfonyl)-aniline, 2-sulfo-4-(β-sulfatoethylsulfonyl)-aniline, 2-sulfo-5-(β-sulfatoethylsulfonyl)aniline, 2,5-dichloro-4-(β-sulfatoethylsulfonyl)-aniline, 4-(β-sulfatoethylsulfonyl)-1-aminonaphthalene, 5-(β-sulfatoethylsulfonyl)-2-aminonaphthalene, 6-(β-sulfatoethylsulfonyl)-2-aminonaphthalene, 7-(β-sulfatoethylsulfonyl)-2-aminonaphthalene, 8-(β-sulfatoethylsulfonyl)-2-aminonaphthalene, 5-(β-sulfatoethylsulfonyl)-1-sulfo-2-aminonaphthalene, 6-(β-sulfatoethylsulfonyl)-1-sulfo-2-aminonaphthalene, 6-(β-sulfatoethylsulfonyl)-8-sulfo-2-aminonaphthalene, 8-(β-sulfatoethylsulfonyl)-6-sulfo-2-aminonaphthalene, 3'-(β-sulfatoethylsulfonyl)-4-aminobenzanilide, 4-amino-Nα-β-[4'-(β'-sulfatoethylsulfonyl)phenyl]-ethyl-benzanilide and 4-amino-N'-β-[2'-sulfo-4'-(β'-sulfatoethylsulfonyl)-phenyl]-ethylbenzanilide.

The coupling components of the general formula (4) are also known from the literature. Examples of these compounds are:

1-[3'-(β-chloroethylsulfonyl)]-benzoylamino-3,6-disulfo-8-naphthol, 1-[4'-(β-chloroethylsulfonyl)]-benzoylamino-3,6-disulfo-8-naphthol, 1-[3'-(β-chloroethylsulfonyl)]-benzoylamino-4,6-disulfo-8-naphthol, 1-[3'-(β-chloroethylsulfonyl)]-benzoylamino-4,6-disulfo-8-naphthol, 2-[3'- or 4'-(β-chloroethylsulfonyl)]-benzoylamino-6-sulfo-8-naphthol, 3-[3'- or 4'-(β-chloroethylsulfonyl)]-benzoylamino-6-sulfo-8-naphthol, 3-[3'- or 4'-(β-chloroethylsulfonyl)]-benzoylamino-4,6-disulfo-8-naphthol, 2-[3'- or 4'-(β-chloroethylsulfonylmethyl)]-benzoylamino-6-sulfo-8-naphthol, 3-[3'- or 4'-(β-chloroethylsulfonylmethyl)]-benzoylamino-6-sulfo-8-naphthol, 3-[3'- or 4'-(β-chloroethylsulfonyl-methyl)]-benzoylamino-4,6-disulfo-8-naphthol, 2-[N-methyl-N-(β-chloroethylsulfonyl)]-amino-6-sulfo-8-naphthol, 3-[N-methyl-N-(β-chloroethylsulfonyl)]-amino-6-sulfo-8-naphthol, 2-[N-ethyl-N-(βchloroethylsulfonyl)]-amino-6-sulfo-8-naphthol, 2-[N-methyl-N-(β-chloroethylsulfonyl)]-amino-3,6-disulfo-8-naphthol and 3-[N-methyl-N-(β-chloroethylsulfonyl)]-amino-4,6-disulfo-8-naphthol.

The separation and isolation of the compounds of the general formula (1) prepared according to the invention from the synthesis solutions can take place by generally known methods, for example either by precipitation from the reaction medium by means of electrolytes, for example sodium chloride or potassium chloride, or by evaporation of the reaction solution, for example spray-drying, it being possible to add a buffer substance to the reaction solution.

The compounds according to the invention of the general formula (1)—hereinafter designated as compounds (1)—have fiber-reactive properties and valuable dye properties. They can therefore be used for the dyeing (including printing) of natural, regenerated or synthetic hydroxy-containing and/or carboxamido-containing materials, for example in the form of sheet-like materials, such as paper and leather or of polyamide or polyurethane, but in particular of those materials which are in fiber form, such as cellulose fiber materials, silk, wool and synthetic polyamide and polyurethane fibers. The solutions which are formed in the synthesis of the compounds (1) can also be used directly, if appropriate after the addition of a buffer substance, if appropriate even after concentration, as liquid preparation for dyeing.

According to the use according to the invention, the compounds (1) can be applied to and fixed on the substrates mentioned, in particular the fiber materials mentioned, by the application procedures known for water-soluble, in particular fiber-reactive dyes, for example by applying the compound (1) in dissolved form to the substrate or incorporating it therein and fixing it on or in this substrate, if appropriate by the action of heat and/or if appropriate by the action of an alkaline agent. These dyeing and fixation procedures have been described in the literature in a large number, such as, for example, in German Offenlegungsschrift No. 3,025,572.

The present invention accordingly also relates to the use of the compounds (1) for the dyeing (including printing) of hydroxy- and/or carboxamido-containing materials and processes for their use on these substrates. Preferably, the materials are used in the form of fiber materials, in particular in the form of textile fibers, such as yarn, wound packages and fabrics. This can be done analogously to known procedures of the application and fixation of fiber-reactive dyes.

The monoazo compounds according to the invention (1) are distinguished by good water solubility and good color buildup. Their degree of fixation is very high, which is the reason that the unfixed portion is very small as the result of which only a small amount of the compound (1) used goes into the waste water together with the rinsing or wash water, when the dyeings and prints are being finished. Unfixed portions can easily be washed off. Furthermore their good stability in printing pastes, padding liquors and dyebaths is worth mentioning. Their dyeings and prints, in particular on cellulose fiber materials, have good fastness to use and processing, such as, for example, good lightfastness, washfastness, chlorinated water fastness, exhaust gas fastness, hot-press fastness, pleating fastness, decatizing fastness, drycleaning fastness, crock fastness, acid fastness, alkali fastness, and crossdyeing fastness, good alkaline and acid perspiration fastness and high stability to acid storage. The prints obtained have crisp contours and a clear white ground; prints and dyeings do not form spots on adjacent material.

The Examples below are intended to illustrate the invention. Parts and percentages are by weight, unless stated otherwise. Parts by weight relate to parts by volume as the kilogram relates to the liter.

The compounds described in these examples by way of their formulae are given in the form of the free acids; in general, they are prepared and isolated in the form of their sodium salts or potassium salts and are used for dyeing in the form of their salts. Likewise, the starting compounds and components mentioned in the Examples below, in particular the Table Examples, in the form of the free acid can be used as such or in the form of their salts, preferably the alkali metal salts, such as sodium salts or potassium salts, in the synthesis. The absorption maxima ($\lambda_{max}$ values) indicated for the visible region were determined using the aqueous solution of the alkali metal salts. In the Table Examples, the $\lambda_{max}$ values are written in brackets next to the hue; the wavelength number refers to nm.

EXAMPLE 1

31.9 parts of 1-amino-4,6-disulfo-8-naphthol are reacted in aqueous solution at a pH of 4 to 5 and a temperature of 15° to 20° C. with 35 parts of 3-($\beta$-chloroethylsulfonyl)benzoyl chloride. The solution of the coupling component thus obtained is stirred into the hydrochloric acid suspension of the diazonium salt of 28.1 parts of 4-($\beta$-sulfatoethylsulfonyl)-aniline in 100 parts of water which has been prepared in a conventional manner; the coupling reaction is carried out at a pH of 5 to 6. The resulting azo compound is salted out with sodium chloride in an amount of 20%, relative to the volume of the solution (to complete the precipitation, stirring of the batch at a pH of 4 is continued for some time), the precipitate is filtered off, washed with a 20% strength aqueous sodium chloride solution and dried under reduced pressure.

This gives a dark red, electrolyte-containing powder of the sodium salt according to the invention of the compound of the formula

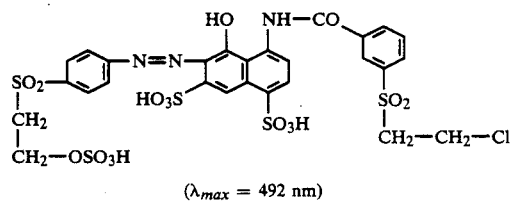

($\lambda_{max}$ = 492 nm)

which has very good fiber-reactive dye properties. It produces, by the dyeing and printing processes customary in industry for fiber-reactive dyes, on the materials mentioned in the description, in particular on cellulose fiber materials, strong brilliant red dyeings and prints which have good fastness properties, of which, in particular, the wash and perspiration fastness properties, the good lightfastness properties, when dry or moistened with drinking water or a perspiration solution, and the good stability to acid storage (no "acid fading", i.e. dyeing and prints are not attacked upon storage in an acid-moist state, such as, for example, in an atmosphere containing acid vapors) may be mentioned in particular. The compound according to the invention has a high degree of fixation and good color buildup; the prints obtained with it have a clear white ground.

EXAMPLE 2

A solution of 31.5 parts of 4-N-methyl-N-$\beta$-chloroethylsulfonyl-benzoyl chloride in 50 parts of acetone is added to 23.9 parts of 3-amino-6-sulfo-8-naphthol in aqueous solution at a pH of 4 to 5 at a temperature of about 20° C. over a period of one hour. Stirring is continued for some time, if appropriate with the addition of a further small amount of the acid chloride, until the reaction has almost gone to completion. The acid aqueous suspension of the diazonium salt of 30.3 parts of 6-($\beta$-sulfatoethylsulfonyl)-1-sulfo-2-aminonaphthalene which has been prepared in a conventional manner is added to the solution of the coupling component thus obtained. The coupling reaction is carried out at a pH of 4 to 5 and a temperature of 15° to 25° C.

The resulting azo compound according to the invention is precipitated at a pH of 4 by the addition of sodium chloride and is isolated. This gives a red, sodium chloride-containing powder of the sodium salt of the compound of the formula

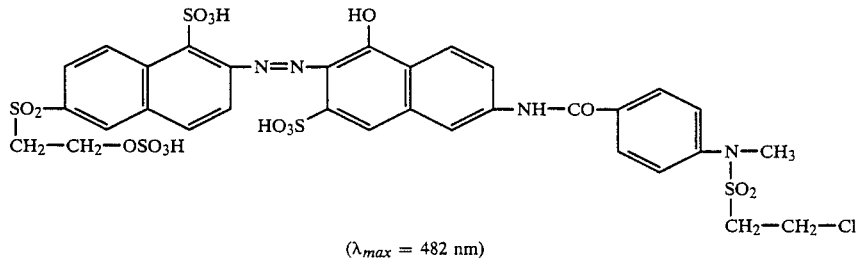

($\lambda_{max}$ = 482 nm)

which has very good fiber-reactive dye properties and, analogously to the statements of Example 1, produces strong orange dyeings and prints which have good fastness properties, such as good wash fastness properties, perspiration fastness properties, dry light and wet light fastness properties and good stability to acid storage. Furthermore, the high degree of fixation and the good color buildup may be mentioned; the prints obtainable by means of the compound according to the invention have a clear white ground.

EXAMPLE 3

A solution of 1-N-[4'-($\beta$-chloroethylsulfonylmethyl)-benzoyl]-amino-3,6-disulfo-8-naphthol as coupling component is prepared by the reaction of 31.9 parts of 1-amino-3,6-disulfo-8-naphthol in neutral solution with 30 parts of 4-($\beta$-chloroethylsulfonylmethyl)-benzoyl chloride analogously to the procedure of Example 1, to which a hydrochloric acid suspension of the diazonium salt of 40 parts of 4-amino-3'-($\beta$-chloroethylsulfonyl)-benzanilide in about 500 parts of water, which is prepared in a conventional manner, is added. The coupling reaction is carried out at a pH between 4 and 5.

The synthesized azo compound according to the invention is isolated in the conventional manner by salting out with sodium chloride or potassium chloride or by spray drying. This gives a dark red, electrolyte-containing powder of the alkali metal salt of the compound of the formula properties, dry light and wet light fastness properties and the good stability to acid storage may be mentioned in particular. The color buildup and the degree of fixation of the compounds according to the invention is very high; the prints have a clear white ground.

EXAMPLE 4

Analogously to the procedure of Example 1, 2,5-dimethoxy-4-($\beta$-sulfatoethylsulfonyl)-aniline is reacted as diazo component with 1-N-[4'-($\beta$-chloroethylsulfonyl)-benzoyl]-amino-3,6-disulfo-8-naphthol as coupling component in equivalent amounts. The azo compound according to the invention of the formula

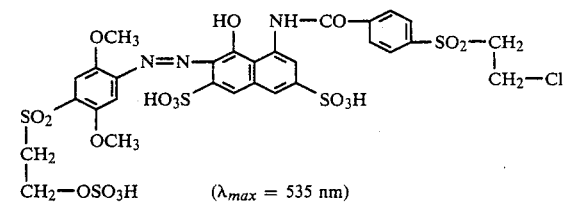

($\lambda_{max}$ = 535 nm)

is isolated in the form of its alkali metal salt and exhibits very good fiber-reactive dye properties. It gives strong, red-violet dyeings and prints which have good fastness properties, such as, for example, good wash fastness, perspiration fastness and light fastness properties and good stability to acid storage. The compound according to the invention furthermore is distinguished by a high degree of fixation and very good color buildup.

EXAMPLE 5

A solution of 89.3 parts of the azo compound according to the invention of Example 4 in 1000 parts of water is adjusted to a pH of 11 to 12 at a temperature of about 20° C. by means of concentrated aqueous sodium hy-

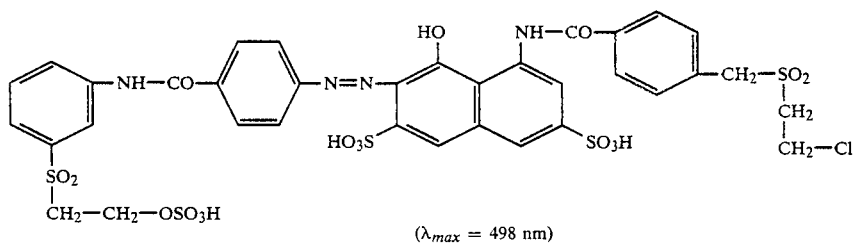

($\lambda_{max}$ = 498 nm)

Which has very good fiber-reactive dye properties and produces, by the dyeing and printing processes customary in industry, strong, bluish red dyeings and prints on the materials mentioned in the description, in particular on cellulose fiber materials. The dyeings and prints are distinguished by good fastness properties, of which the good wash fastness properties, perspiration fastness droxide solution. Stirring of the batch at 20° C. is continued for 5 minutes, and the mixture is then brought to a pH of 5 by means of a mixture of concentrated aqueous hydrochloric acid and acetic acid. The vinylsulfonyl azo compound thus obtained precipitates after a short time; the precipitation is completed by the addition of sodium chloride or potassium chloride. The precipitate is isolated and dried under reduced pressure.

This gives a blue-red powder of the alkali metal salt of the azo compound of the formula

EXAMPLES 6 TO 74

In the Table Examples below, further monoazo compounds according to the invention are described by

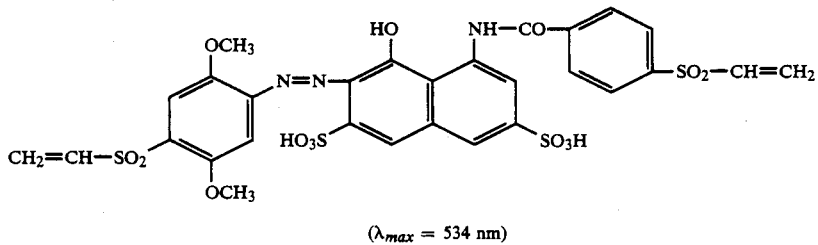

($\lambda_{max}$ = 534 nm)

which has only a low electrolyte content. This compound according to the invention also exhibits very good fiber-reactive dye properties and produces, in particular on cellulose fiber materials, bluish red dyeings which have the same good fastness properties as those described for the dyeings of the compound according to the invention of Example 4.

means of the components in accordance with the general formula (1). They can be prepared according to the invention, for example according to one of the Working Examples above, by means of the components shown in the particular Table Example. They have fiber-reactive dye properties and produce, in particular on cellulose fiber materials, by the application and fixation methods customary for fiber-reactive dyes, strong dyeings and prints which have good fastness properties in the hues mentioned in the particular Table Example for the dyeings on cotton.

| Ex. | Radical X-SO$_2$T-D- | Component according to formula (4) | Hue |
| --- | --- | --- | --- |
| 6 | 3-($\beta$-sulfatoethylsulfonyl)-phenyl | 1-N-[3'-($\beta$-chloroethylsulfonyl)-benzoyl]-amino-3,6-disulfo-8-naphthol | red (500) |
| 7 | 2-methoxy-5-($\beta$-sulfatoethylsulfonyl)-phenyl | 1-N-[3'-($\beta$-chloroethylsulfonyl)-benzoyl]-amino-3,6-disulfo-8-naphthol | bluish red (515) |
| 8 | 2-methoxy-4-($\beta$-sulfatoethylsulfonyl)-phenyl | 1-N-[3'-($\beta$-chloroethylsulfonyl)-benzoyl]-amino-3,6-disulfo-8-naphthol | reddish violet (520) |
| 9 | 2-methoxy-5-methyl-4-($\beta$-sulfatoethylsulfonyl)-phenyl | 1-N-[3'-($\beta$-chloroethylsulfonyl)-benzoyl]-amino-3,6-disulfo-8-naphthol | reddish violet (525) |
| 10 | 2,5-dimethoxy-4-($\beta$-sulfatoethylsulfonyl)-phenyl | 1-N-[3'-($\beta$-chloroethylsulfonyl)-benzoyl]-amino-3,6-disulfo-8-naphthol | violet (531) |
| 11 | 2-bromo-4-($\beta$-sulfatoethylsulfonyl)-phenyl | 1-N-[3'-($\beta$-chloroethylsulfonyl)-benzoyl]-amino-3,6-disulfo-8-naphthol | bluish red (502) |
| 12 | 2-sulfo-4-($\beta$-sulfatoethylsulfonyl)-phenyl | 1-N-[3'-($\beta$-chloroethylsulfonyl)-benzoyl]-amino-3,6-disulfo-8-naphthol | bluish red |
| 13 | 2-sulfo-5-($\beta$-sulfatoethylsulfonyl)-phenyl | 1-N-[3'-($\beta$-chloroethylsulfonyl)-benzoyl]-amino-3,6-disulfo-8-naphthol | red (500) |
| 14 | 2-chloro-5-($\beta$-sulfatoethylsulfonyl)-phenyl | 1-N-[3'-($\beta$-chloroethylsulfonyl)-benzoyl]-amino-3,6-disulfo-8-naphthol | red |
| 15 | 2,5-dichloro-5-($\beta$-sulfatoehylsulfonyl)-phenyl | 1-N-[3'-($\beta$-chloroethylsulfonyl)-benzoyl]-amino-3,6-disulfo-8-naphthol | red |
| 16 | 2-carboxy-5-($\beta$sulfatoethylsulfonyl)-phenyl | 1-N-[3'-($\beta$-chloroethylsulfonyl)-benzoyl]-amino-3,6-disulfo-8-naphthol | bluish red |
| 17 | 4-methoxy-3-($\beta$-sulfatoethylsulfonyl)-phenyl | 1-N-[3'-($\beta$-chloroethylsulfonyl)-benzoyl]-amino-3,6-disulfo-8-naphthol | bluish red |
| 18 | 2-methoxy-5-chloro-4-($\beta$-sulfatoethylsulfonyl)-phenyl | 1-N-[3'-($\beta$-chloroethylsulfonyl)-benzoyl]-amino-3,6-disulfo-8-naphthol | reddish violet (511) |
| 19 | 2,4-dimethoxy-5-($\beta$-sulfatoethylsulfonyl)-phenyl | 1-N-[3'-($\beta$-chloroethylsulfonyl)-benzoyl]-amino-3,6-disulfo-8-naphthol | reddish violet |
| 20 | 4-chloro-3-($\beta$-sulfatoethylsulfonyl)-phenyl | 1-N-[3'-($\beta$-chloroethylsulfonyl)-benzoyl]-amino-3,6-disulfo-8-naphthol | bluish red |
| 21 | 4-($\beta$-sulfatoethylsulfonyl)-naphth-1-yl | 1-N-[3'-($\beta$-chloroethylsulfonyl)-benzoyl]-amino-3,6-disulfo-8-naphthol | violet (552) |
| 22 | 5-($\beta$-sulfatoethylsulfonyl)-naphth-2-yl | 1-N-[3'-($\beta$-chloroethylsulfonyl)-benzoyl]-amino-3,6-disulfo-8-naphthol | reddish violet |
| 23 | 6-($\beta$-sulfatoethylsulfonyl)-naphth-2-yl | 1-N-[3'-($\beta$-chloroethylsulfonyl)-benzoyl]-amino-3,6-disulfo-8-naphthol | reddish violet |
| 24 | 7-($\beta$-sulfatoethylsulfonyl)-naphth-2-yl | 1-N-[3'-($\beta$-chloroethylsulfonyl)-benzoyl]-amino-3,6-disulfo-8-naphthol | reddish violet |
| 25 | 8-($\beta$-sulfatoethylsulfonyl)-naphth-2-yl | 1-N-[3'-($\beta$-chloroethylsulfonyl)-benzoyl]-amino-3,6-disulfo-8-naphthol | reddish violet (545) |
| 26 | 6-($\beta$-sulfatoethylsulfonyl)-1-sulfo-naphth-2-yl | 1-N-[3'-($\beta$-chloroethylsulfonyl)-benzoyl]-amino-3,6-disulfo-8-naphthol | bluish red (534) |
| 27 | 8-($\beta$-sulfatoethylsulfonyl)-6-sulfo-naphth-2-yl | 1-N-[3'-($\beta$-chloroethylsulfonyl)-benzoyl]-amino-3,6-disulfo-8-naphthol | reddish violet (542) |
| 28 | 6-($\beta$-sulfatoethylsulfonyl)-8-sulfo-naphth-2-yl | 1-N-[3'-($\beta$-chloroethylsulfonyl)-benzoyl]-amino-3,6-disulfo-8-naphthol | reddish violet (540) |
| 29 | 5-($\beta$-sulfatoethylsulfonyl)- | 1-N-[3'-($\beta$-chloroethylsulfonyl)-benzoyl]- | reddish violet |

-continued

| Ex. | Radical X-SO₂T-D- | Component according to formula (4) | Hue |
|---|---|---|---|
|  | 1-sulfo-naphth-2-yl | amino-3,6-disulfo-8-naphthol |  |
| 30 | 6-vinylsulfonyl-1-sulfo-naphth-2-yl | 1-N-[3'-(β-chloroethylsulfonyl)-benzoyl]-amino-3,6-disulfo-8-naphthol | bluish red (538) |
| 31 | 8-vinylsulfonyl-6-sulfo-naphth-2-yl | 1-N-[3'-(β-chloroethylsulfonyl)-benzoyl]-amino-3,6-disulfo-8-naphthol | reddish violet (540) |
| 32 | 6-vinylsulfonyl-8-sulfo-naphth-2-yl | 1-N-[3'-(β-chloroethylsulfonyl)-benzoyl]-amino-3,6-disulfo-8-naphthol | reddish violet |
| 33 | 5-vinylsulfonyl-1-sulfo-naphth-2-yl | 1-N-[3'-(β-chloroethylsulfonyl)-benzoyl]-amino-3,6-disulfo-8-naphthol | bluish red (535) |
| 34 | 4-vinylsulfonyl-2-sulfophenyl | 1-N-[3'-(β-chloroethylsulfonyl)-benzoyl]-amino-3,6-disulfo-8-naphthol | bluish red (495) |
| 35 | 5-vinylsulfonyl-2-sulfophenyl | 1-N-[3'-(β-chloroethylsulfonyl)-benzoyl]-amino-3,6-disulfo-8-naphthol | red (492) |
| 36 | 4-{N-[3'-(β-sulfatoethylsulfonyl)-phenyl]-amidocarbonyl}-phenyl | 1-N-[3'-(β-chloroethylsulfonyl)-benzoyl]-amino-3,6-disulfo-8-naphthol | red (498) |
| 37 | 4-{N-β-[4'-(β'-sulfatoethylsulfonyl)-phenyl]-ethyl-amidocarbonyl}-phenyl | 1-N-[3'-(β-chloroethylsulfonyl)-benzoyl]-amino-3,6-disulfo-8-naphthol | bluish red |
| 38 | 4-{N-β-[3'-sulfo-4'-(β-sulfatoethylsulfonyl)-phenyl]-ethylamidocarbonyl}-phenyl | 1-N-[3'-(β-chloroethylsulfonyl)-benzoyl]-amino-3,6-disulfo-8-naphthol | bluish red |
| 39 | 6-vinylsulfonyl-1-sulfo-naphth-2-yl | 1-{4'-[N'-methyl-N-'-(β-chloroethylsulfonyl)-benxoyl}-amino-3,6-disulfo-8-naphthol | red (540) |
| 40 | 4-(β-sulfatoethylsulfonyl)-phenyl | 1-N-[3'-(β-chloroethylsulfonyl)-benzoyl]-amino-3,6-disulfo-8-naphthol | bluish red (502) |
| 41 | 4-(β-sulfatoethylsulfonyl)-phenyl | 1-N-[4'-(β-chloroethylsulfonyl)-benzoly]-amino-3,6-disulfo-8-naphthol | bluish red (500) |
| 42 | 4-(β-sulfatoethylsulfonyl)-phenyl | 1-{4'-[N'-methyl-N'-)β-chloroethylsulfonyl)-benzoyl}-amino-3,6-disulfo-8-naphthol | bluish red |
| 43 | 4-(β-sulfatoethylsulfonyl)-phenyl | 1-{3'-[N'-ethyl-N'-(β-chloroethylsulfonyl)-benzoyl}-amino-3,6-disulfo-8-naphthol | bluish red |
| 44 | 4-(β-sulfatoethylsulfonyl)-phenyl | 1-[4'-(β-chloroethylsulfonyl-methyl)-benzoyl]-amino-4,6-disulfo-8-naphthol | red |
| 45 | 4-(β-sulfatoethylsulfonyl)-phenyl | 1-[3'-(β-chloroethylsulfonyl-methyl)-benzoyl]-amino-4,6-disulfo-8-naphthol | red (490) |
| 46 | 4-(β-sulfatoethylsulfonyl)-phenyl | 1-[4'-(β-chloroethylsulfonyl)-benzoyl]-amino-4,6-disulfo-8-naphthol | red |
| 47 | 4-(β-sulfatoethylsulfonyl)-phenyl | 1-{4'-[N'-methyl-N-(β-chloroethylsulfonyl)-benzoyl}-amino-4,6-disulfo-8-naphthol | red (492) |
| 48 | 4-(β-sulfatoethylsulfonyl)-phenyl | 1-{3'-[N'-ethyl-N'-(β-chloroethylsulfonyl)-benzoyl}-amino-4,6-disulfo-8-naphthol | red |
| 49 | 4-vinylsulfonyl-phenyl | 1-[4'-(β-chloroethylsulfonyl-methyl)-benzoyl]-amino-4,6-disulfo-8-naphthol | red (495) |
| 50 | " | 1-[4'-(β-chloroethylsulfonyl-methyl)-benzoyl]-amino-3,6-disulfo-8-naphthol | red |
| 51 | " | 3-[4'-(β-chloroethylsulfonyl-methyl)-benzoyl]-amino-4,6-disulfo-8-naphthol | orange |
| 52 | " | 2-[4'-(β-chloroethylsulfonyl-methyl)-benzoyl]-amino-3,6-disulfo-8-naphthol | red |
| 53 | 4-(β-sulfatoethyl-sulfonyl)-phenyl | 3-[4'-(β-chloroethylsulfonyl-methyl)-benzoyl]-amino-6-sulfo-8-naphthol | orange (480) |
| 54 | 4-(β-sulfatoethyl-sulfonyl)-phenyl | 2-[4'-(β-chloroethylsulfonyl-methyl)-benzoyl]-amino-6-sulfo-8-naphthol | orange (482) |
| 55 | 2-methoxy-5-(β-sulfato-ethylsulfonyl)-phenyl | 1-[4'-(β-chloroethylsulfonyl-methyl)-benzoyl]-amino-3,6-disulfo-8-naphthol | bluish red |
| 56 | 2-methoxy-5-(β-sulfato-ethylsulfonyl)-phenyl | 1-[4'-(β-chloroethylsulfonyl-methyl)-benzoyl] -amino-4,6-disulfo-8-naphthol | red |
| 57 | 2-methoxy-5-(β-sulfato-ethylsulfonyl)-phenyl | 2-[4'-(β-chloroethylsulfonyl-methyl)-benzoyl]-amino-3,6-disulfo-8-naphthol | red (510) |
| 58 | 2-methoxy-5-(β-sulfato-ethylsulfonyl)-phenyl | 3-[4'-(β-chloroethylsulfonyl-methyl)-benzoyl]-amino-4,6-disulfo-8-naphthol | orange |
| 59 | 2,5-dimethoxy-4-(β-sulfatoethylsulfonyl)-phenyl | 3-[4'-(β-chloroethylsulfonyl-methyl)-benzoyl]-amino-4,6-disulfo-8-naphthol | red |
| 60 | 2,5-dimethoxy-4-(β-sulfatoethylsulfonyl)-phenyl | 1-[4'-(β-chloroethylsulfonyl-methyl)-benzoyl]-amino-3,6-disulfo-8-naphthol | violet (532) |
| 61 | 2,5-dimethoxy-4-(β-sulfatoethylsulfonyl)-phenyl | 1-[4'-(β-chloroethylsulfonyl-methyl)-benzoyl]-amino-4,6-disulfo-8-naphthol | reddish violet |
| 62 | 2,5-dimethoxy-4-(β-sulfatoethylsulfonyl)-phenyl | 2-[4'-(β-chloroethylsulfonyl-methyl)-benzoyl]-amino-3,6-disulfo-8-naphthol | reddish violet (530) |
| 63 | 6-(β-sulfatoethylsulfonyl)-1-sulfo-naphth-2-yl | 2-[4'-(β-chloroethylsulfonyl-methyl)-benzoyl]-amino-3,6-disulfo-8-naphthol | bluish red |
| 64 | 6-(β-sulfatoethylsulfonyl)-1-sulfo-naphth-2-yl | 3-[4'-(β-chloroethylsulfonyl-methyl)-benzoyl]-amino-4,6-disulfo-8-naphthol | bluish red (540) |
| 65 | 6-(β-sulfatoethylsulfonyl)-1-sulfo-naphth-2-yl | 1-[4'-(β-chloroethylsulfonyl-methyl)-benzoyl]-amino-3,6-disulfo-8-naphthol | reddish violet (506) |

-continued

| Ex. | Radical X-SO₂T-D- | Component according to formula (4) | Hue |
|---|---|---|---|
| 66 | 6-(β-sulfatoethylsulfonyl)-1-sulfo-naphth-2-yl | 1-[4'-(β-chloroethylsulfonyl-methyl)-benzoyl]-amino-4,6-disulfo-8-naphthol | bluish red |
| 67 | 6-(β-sulfatoethylsulfonyl)-1-sulfo-naphth-2-yl | 3-[4'-(β-chloroethylsulfonyl-methyl)-benzoyl]-amino-6-sulfo-8-naphthol | orange |
| 68 | 6-(β-sulfatoethylsulfonyl)-1-sulfo-naphth-2-yl | 2-[4'-(β-chloroethylsulfonyl-methyl)-benzoyl]-amino-6-sulfo-8-naphthol | red |
| 69 | 6-vinylsulfonyl-1-sulfo-naphth-2-yl | 1-[4' -(β-chloroethylsulfonyl-benzoyl]-amino-3,6-disulfo-8-naphthol | bluish red (538) |
| 70 | 6-vinylsulfonyl-1-sulfo-naphth-2-yl | 1-[4'-(β-chloroethylsulfonyl-benzoyl]-amino-4,6-disulfo-8-naphthol | red (508) |
| 71 | 6-vinylsulfonyl-1-sulfo-naphth-2-yl | 1-{4'-[N'-methyl-N'-(β-chloroethyl-sulfonyl)]benzoyl}amino-4,6-disulfo-8-naphthol | red (510) |
| 72 | 4-(β-sulfatoethyl-sulfonyl)-phenyl | 1-[4'-(β-chloroethylsulfonyl-methyl)-benzoyl]-amino-3,6-disulfo-8-naphthol | bluish red |
| 73 | 4-(β-sulfatoethyl-sulfonyl)-phenyl | 1-[3'-(β-chloroethylsulfonyl)-benzoyl]-amino-3,6-disulfo-8-naphthol | bluish red |
| 74 | 6-vinylsulfonyl-1-sulfo-napth-2-yl | 1{4'-[N'-methyl-N'-(β-chloroethyl-sulfonyl)]-benzoyl}-amino-3,6-disulfo-8-naphthol | bluish red |

We claim:
1. A water-soluble azo compound conforming to the formula

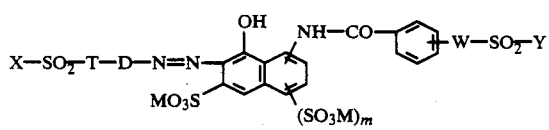

in which:
M is hydrogen or an alkali metal,
T is a direct covalent bond or methylene or a divalent amino group of the formula —N(R)—, in which R is an alkyl of 1 to 4 carbon atoms,
D is a group of the formula

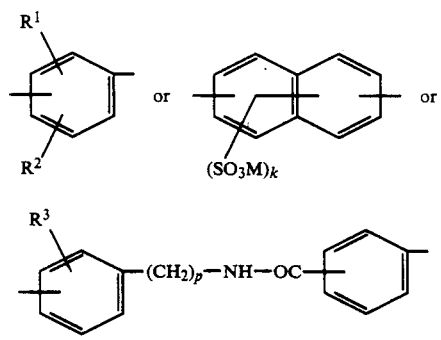

in which
$R^1$ is alkyl of 1 to 4 carbon atoms hydroxy, nitro, hydrogen, alkoxy of 1 to 4 carbon atoms, chlorine, bromine or carboxy,
$R^2$ is hydrogen, alkyl of 1 to 4 carbon atoms, alkoxy of 1 to 4 carbon atoms, chlorine or sulfo,
$R^3$ is hydrogen or sulfo,
k is the number zero or 1 (where, if k is zero, this group is hydrogen),
p is the number zero, 1 or 2 and
M has the abovementioned meaning;
m is the number zero, 1 or 2 (where, if m is zero, this group is hydrogen);
W has one of the meanings of T;
X is vinyl, β-chloroethyl, β-thiosulfatoethyl or βsulfatoethyl;
Y is vinyl or β-chloroethyl;
the fiber-reactive benzoylamino grouping is bound to the 8-naphthol radical in the 1-, 2- or 3-position;
the individual formula members can have meanings which are identical to or different from one another.

2. A compound as claimed in claim 1, wherein D is a radical of the general formula (2)

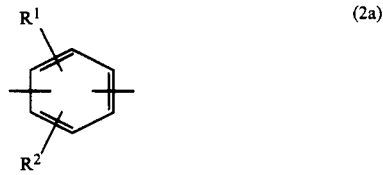

in which $R^1$ is hydrogen, methoxy, ethoxy, chlorine, bromine or carboxyl and $R^2$ is hydrogen, methyl, ethyl, methoxy, ethoxy, chlorine or sulfo.

3. A compound as claimed in claim 1, wherein D is a naphthylene radical which can be substituted by a sulfo group.

4. A compound as claimed in claim 1, wherein X is the β-sulfatoethyl group.

5. A compound as claimed in claim 1, wherein Y is the β-chloroethyl group.

6. A compound as claimed in claim 1, wherein W is the methylene group.

7. A compound as claimed in claim 1, wherein W is the divalent (N-methyl)-amino group.

8. A compound as claimed in claim 1, wherein T is a direct covalent bond.

9. A compound as claimed in claim 2, wherein X is the β-sulfatoethyl radical.

10. A compound as claimed in claim 3, wherein X is the β-sulfatoethyl group.

11. A compound as claimed in claim 5, wherein X is the β-sulfatoethyl group.

12. A compound as claimed in claim 6, wherein X is the β-sulfatoethyl group.

13. A compound as claimed in claim 7, wherein X is the β-sulfatoethyl group.

14. A compound as claimed in claim 8, wherein X is the β-sulfatoethyl group.

15. A compound as claimed in claim 2, wherein Y is the β-chloroethyl group.

16. A compound as claimed in claim 3, wherein Y is the β-chloroethyl group.

17. A compound as claimed in claim 6, wherein Y is the β-chloroethyl group.

18. A compound as claimed in claim 7, wherein Y is the β-chloroethyl radical.

19. A compound as claimed in claim 1 conforming to the formula

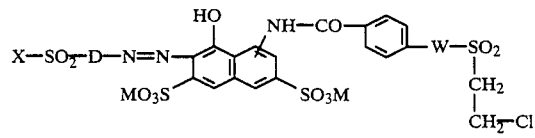

in which the benzoylamino grouping is bound to the 8-naphthol radical in the 2-position or in the 1-position.

20. A compound as claimed in claim 19, wherein W is the methylene group.

21. A compound as claimed in claim 1 of the formula

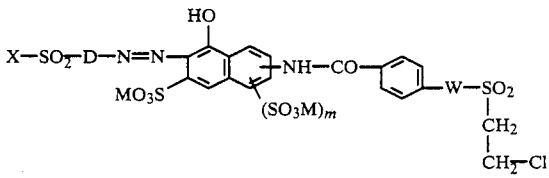

in which the benzoylamino grouping is bound to the 8-naphthol component in the 2- or 3-position.

22. A compound as claimed in claim 21, wherein the benzoylamino grouping is bound to the 8-naphthol radical in the 3-position, m is the number 1 and this group —SO₃M is bound to the 8-naphthol radical in the 4-position.

* * * * *